(No Model.)

J. P. RIEFFEL.
COVER FOR VESSELS.

No. 380,137. Patented Mar. 27, 1888.

WITNESSES:
Jos. U. Rosenbaum
Martin Petry

INVENTOR,
John P. Rieffel
BY
Goepel & Raegener,
ATTORNEYS.

UNITED STATES PATENT OFFICE.

JOHN PHILIPP RIEFFEL, OF NEW YORK, N. Y.

COVER FOR VESSELS.

SPECIFICATION forming part of Letters Patent No. 380,137, dated March 27, 1888.

Application filed December 18, 1885. Serial No. 186,039. (No model.)

*To all whom it may concern:*

Be it known that I, JOHN PHILIPP RIEFFEL, of the city, county, and State of New York, have invented certain new and useful Improvements in Covers for Vessels, of which the following is a specification.

This invention relates to an improved cover for vessels of all kinds, which cover can be readily attached to or detached from the vessel in case of breakage of the same, so that the same cover can be used; and the invention consists of a cover for vessels composed of a lid having a handle and U-shaped clasp, to which the lid is hinged, said clasp being applied to the rim of the vessel and secured thereto by a clamping screw or screws passing through holes in the outer prong of the clasp and engaging a washer-plate that protects the vessel against the direct pressure of the screws.

Figure 1:
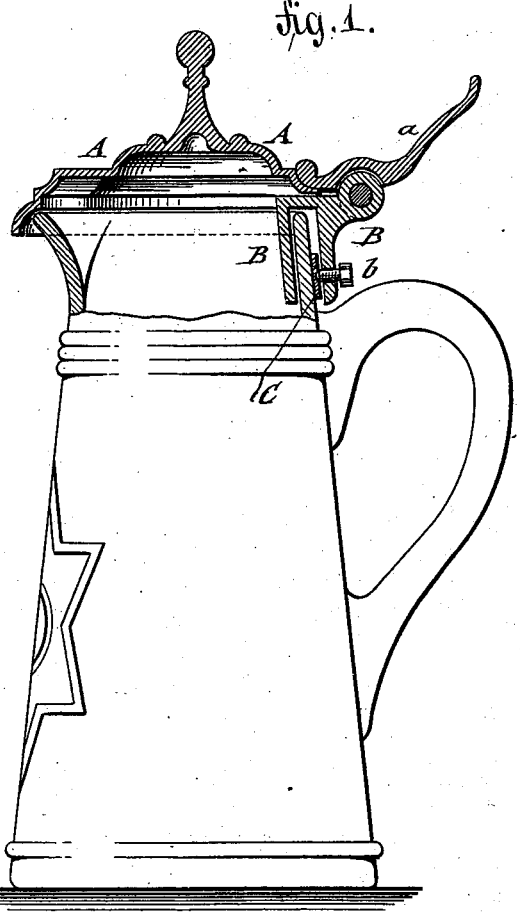
Figure 2:
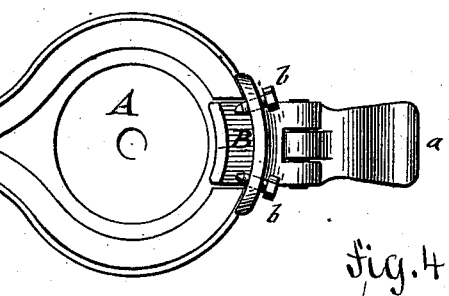
Figure 3:
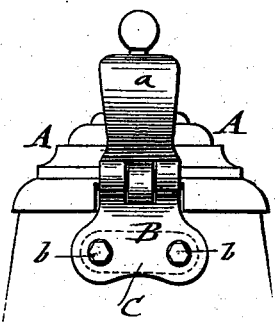
Figure 4:
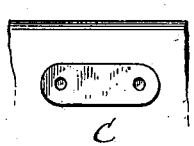

In the accompanying drawings, Figure 1 represents a side elevation of a vessel with my improved cover, the latter being shown in vertical longitudinal section. Fig. 2 is a bottom view of the cover, including the lid and the clasp, detached from the vessel. Fig. 3 is an end view of the same attached to the vessel, showing the hinge-connection of the lid and the clasp; and Fig. 4 is a detail side view of the washer-plate.

Similar letters of reference indicate corresponding parts.

Referring to the drawings, A represents the lid of my improved cover for vessels of all kinds, which lid corresponds to the shape of the mouth of the vessels, and is hinged to a U-shaped clasp, B. A handle, a, extends backward over the clasp B and serves for opening and closing the lid. The U-shaped clasp B is placed over the rim of the vessel, above the handle of the same, and attached thereto by one or more clamping-screws, b b, that are passed through screw-holes of the outer prong of the clasp B, the pointed ends of the clamping-screws engaging depressions in a washer-plate, C, that is cemented or otherwise applied to the rim of the vessel. The washer-plate C is made smaller than the outer prong of the clasp B, so as to be covered thereby. The washer-plate C serves for protecting the vessel against the direct pressure of the clamping-screws, so that it is not exposed to the danger of breaking or cracking at that part to which the clasp B is applied.

Should the vessel break by accident or carelessness, the cover can be conveniently removed and attached to another vessel, which is of advantage when the cover is finished in an ornamental manner.

I am aware that it is not new to secure a plate in a recess near the upper edge of a teapot or other vessel by means of a bolt passing through the vessel and said plate, the cover of the vessel being hinged to said plate.

I am also aware that it is old to hinge a cover to a piece having a hook-shaped arm at one side embracing the upper edge of the vessel, and clamping devices at the other side extending to and connected with the handle of said vessel, whereby said piece is secured in place. In the present invention there is no hole in the body of the vessel, nor has the cover any connection with the handle.

Having thus described my invention, I claim as new and desire to secure by Letters Patent—

1. A cover for vessels, consisting of a lid having a handle, a U-shaped clasp hinged to the handle, the prongs of said clasp being adapted to straddle the rim of the vessel, and a clamping-screw which engages a threaded hole in one prong of said clasp and binds on said vessel so as to hold the cover in place, substantially as set forth.

2. The combination of a vessel having a fixed washer-plate below the rim of the same, a lid having a handle, a U-shaped clasp hinged to said handle and adapted to straddle the rim of the vessel and its washer-plate, and a clamping screw or screws engaging a threaded hole or holes of one prong of said clasp and binding on the washer-plate so as to hold the lid in place, substantially as set forth.

In testimony that I claim the foregoing as my invention I have signed my name in presence of two subscribing witnesses.

JOHN PHILIPP RIEFFEL.

Witnesses:
PAUL GOEPEL,
MARTIN PETRY.